United States Patent [19]

Takahashi et al.

[11] Patent Number: 4,913,490

[45] Date of Patent: Apr. 3, 1990

[54] AUXILIARY CHAIR MOUNTED IN VEHICLE

[75] Inventors: Takehiko Takahashi; Hideo Saito; Takashi Watanabe; Tomihiro Kaneko, all of Tokyo, Japan

[73] Assignee: Combi Co., Ltd., Tokyo, Japan

[21] Appl. No.: 262,907

[22] Filed: Oct. 26, 1988

[30] Foreign Application Priority Data

Oct. 26, 1987 [JP]  Japan ........................ 65-162554[U]
Nov. 2, 1987 [JP]  Japan ........................ 65-166858[U]

[51] Int. Cl.⁴ .............................................. A47C 1/08
[52] U.S. Cl. .................................. 297/250; 297/130; 297/325; 297/468
[58] Field of Search ............... 297/250, 468, 482, 130, 297/325; 280/801

[56] References Cited

U.S. PATENT DOCUMENTS

| | | | |
|---|---|---|---|
| 4,451,087 | 5/1984 | Tamamushi | 297/468 |
| 4,557,523 | 12/1985 | Motanami et al. | 297/468 |
| 4,733,909 | 3/1988 | Single, II et al. | 297/250 |
| 4,743,064 | 5/1988 | Takizawa | 297/250 |
| 4,768,828 | 9/1988 | Kohketsu | 297/250 |
| 4,770,468 | 9/1988 | Shubin | 297/250 X |

Primary Examiner—Peter R. Brown
Attorney, Agent, or Firm—Sughrue, Mion, Zinn, Macpeak & Seas

[57] ABSTRACT

An auxiliary chair is to be removably mounted on an automotive seat. The chair comprises a seat portion having a front edge and a rear edge, a backrest extending from said rear edge of the seat portion, and an adjuster a slant angle of the seat portion. The adjuster includes a pair of adjusting bars each of which pivotally attached at its proximal end to a lower portion of the seat portion, so that the adjusting bar may take a forward portion and a rearward position. A fixing mechanism includes a pair of engaging levers each of which is pivotally attached at its proximal end portion to a side surface of the seat portion so that its distal end portion may freely be angularly moved. The fixing mechanism further includes associated engagement mechanisms each of which is provided at the side of the seat portion and is engagable with the proximal end portion of the engaging lever.

7 Claims, 6 Drawing Sheets

AUXILIARY CHAIR MOUNTED IN VEHICLE

BACKGROUND OF THE INVENTION

The present invention relates to an auxiliary chair mounted on a seat of a vehicle, particularly on the seat of a motor vehicle, to sit a little child in the chair.

It is very dangerous for a little child, who cannot stably sit on the seat of a motor vehicle by himself, or a little child, who can stably sit on the seat of the vehicle by himself but cannot flexibly cope with a jolt, a shock or the like due to the movement of the vehicle, to sit on the seat of the vehicle. In order to avoid injury to the child, a conventional auxiliary chair having a construction appropriate to restrain a little child in the chair is mounted on the seat of a motor vehicle. The conventional auxiliary chair is fastened to the seat of the motor vehicle by using the seat belt thereof. The auxiliary chair can be mounted on the seat of the vehicle either to make the child face in the same direction as the driver of the vehicle or to make the child face in the reverse direction to the driver.

Means for fastening such conventional auxiliary chairs to the seats of motor vehicles were disclosed in the Japanese Patent Examined Publication No. 33181/82.

The above-described fastening means of the auxiliary seat is so constructed that the fastening means utilizes the seat belt which is inherently installed in the automotive vehicle. The fastening means is used so that the seat belt is engaged with the auxiliary seat mounted on the automotive seat and is tightened to fasten the fastening means.

The seat belt engaging means of the conventional auxiliary chairs is of such a fixed type that the seat belts of the motor vehicles cannot be engaged with or disengaged from the seat belt engaging means except by such manipulation as inserting the seat belt into an engaging lever attached to the side, back or the like of the chair and then pulling out the seat belt to the other side or the like of the chair. For that reason, the seat belt engaging means and the seat belt for fastening the auxiliary chair to the seat of the motor vehicle cannot be freely engaged with or disengaged from each other.

When the direction of the auxiliary chair fastened to the seat of the motor vehicle by the seat belt thereof and the seat belt engaging means is to be changed, the seat belt needs to be pulled out of the engaging lever. When the auxiliary chair whose direction is already changed is to be fastened to the seat of the motor vehicle again, the seat belt thereof needs to be inserted through the engaging lever again. For these reasons, it is troublesome to fasten and unfasten the auxiliary chair to and from the seat of the motor vehicle by using the seat belt thereof and the seat belt engaging means. Since the seats of most motor vehicles are constructed so that the thickness of each of the seats decreases gradually from the front end toward the rear end thereof and the sitting surface of the seat is inclined downwardly toward the rear end, each of the auxiliary chairs whose backs extend from the rear ends of the seats of the chairs almost perpendicularly thereto and which are mounted on the seats of the motor vehicles to face in the same direction as the driver thereof is tilted backward as a whole due to the inclination of the sitting surface of the seat of the motor vehicle even if the chair is not desired to be in a reclining position. For that reason, the child sitting in the chair does not feel comfortable.

When the conventional auxiliary chair, constructed to be kept in the optimal setup position for mounting on the seat of the motor vehicle to face in the same direction as the driver of the vehicle, is mounted on the seat of the vehicle to face in the reverse direction to the driver thereof, the chair is inclined backward due to the inclination of the sitting surface of the seat of the vehicle so that the back of the chair is located very near the back for the seat of the vehicle. For that reason, the child sitting in the auxiliary chair is not only forced to feel pressure from the back for the seat of the vehicle but also cannot take a proper posture in the chair. It has been desired that, in the case where the auxiliary seat is installed either forwardly or backwardly, the auxiliary seat be kept at an optimum position or angle.

Also, there has been provided an auxiliary seat that may be used forwardly or backwardly and has a reclining mechanism. However, such a conventional mechanism is so constructed that the automotive seat belt is directly applied to the reclining mechanism as shown in Japanese Utility Model Unexamined Publication No. 60-4437. Accordingly, such a conventional reclining mechanism suffers from disadvantages such that it is costly and intricate in structure.

SUMMARY OF THE INVENTION

The present invention was made in order to eliminate the above-mentioned drawback of the conventional auxiliary chairs.

Accordingly, it is an object of the present invention to provide a fastening mechanism, for an auxiliary chair mounted in a vehicle, which can fasten the chair in either the forward or backward direction to the seat of the vehicle through the use of the seat belt thereof in a very simple manner without inserting the seat belt into the engaging lever.

In the fastening mechanism, the butts of engaging levers, whose tips are free ends, are pivotally coupled to the sides of the seat portion of the body of the auxiliary chair having a back integrally extending up from the rear end of the seat, so that the tips of the engaging levers can be engaged with and disengaged from engaging means provided on the sides of the seat.

It is troublesome to insert the vehicle seat belt according to the prior art to fasten the auxiliary chair to the seat of the vehicle because seat belt insertion means are fixed to the chair in the prior art. However, according to the invention, it is easy to fasten the chair to the seat of the vehicle by the above-mentioned fastening mechanism which has engaging levers, pivotally coupled at only the proximal ends or butts thereof to the sides of the seat of the auxiliary chair, to fasten the seat belt to the chair. The auxiliary chair is put on the seat of the vehicle, the tips of the engaging levers are then engaged with the engaging means, and the seat belt is thereafter engaged with the chair. Otherwise, the auxiliary chair is put on the seat of the vehicle, the tips of the engaging levers are then disengaged from the engaging means, the seat belt is then engaged with the chair, and the tips of the engaging levers are thereafter engaged with the engaging means. The seat belt can thus be engaged with the auxiliary chair. This makes it possible to easily engage the seat belt with the auxiliary chair.

Since the seat belt of the vehicle can be engaged with and tightened on the auxiliary chair as the little child remains sitting in the chair, it is easy to handle the chair.

In any case where the auxiliary chair faces forward or backward, the chair can be fastened to the seat of the vehicle by using only the engaging levers Therefore, it is simple to fasten the auxiliary chair to the seat of the vehicle.

Since the seat belt of the vehicle is engaged with the auxiliary chair at only the bottom and side thereof, the seat belt does not interfere with the body of the little child sitting in the chair. Therefore, the child is comfortable sitting in the chair.

Since the constitution of the fastening mechanism is simple, it can be manufactured at a low cost.

It is another object of the present invention to provide a reclining mechanism for an auxiliary chair mounted on the seat of a vehicle, in which a height adjuster is attached to a bottom of the chair to keep the chair at a desired inclination angle or a desired reclination angle depending upon the inclination of the sitting surface of the seat of the vehicle. It is very simple to manipulate the height adjuster. In the height adjuster, the ends of a height adjusting bar shaped as U are pivotally coupled to the bottom of the seat of the auxiliary chair so that the bar can be displaced forward and backward. Both ends of a setup rod, similar in form to the height adjuster bars, are pivotally coupled to insides of both the side portions of the bar so that the setup height of the bar can be increased by setting up the rod.

The excessive forward or backward inclination of the auxiliary chair, which is caused when the chair is fastened to the backward and downwardly inclined sitting surface of the seat of the vehicle, can easily be corrected by the reclining mechanism to use the chair in the optimum position.

The adjustment of the inclination angle of the auxiliary chair on the seat of the vehicle and the reclining operation of the chair can be performed by the very simple manipulation of angularly displacing the height adjuster attached to the bottom of the seat of the chair. In any case where the auxiliary chair faces forward or backward, the single height adjuster can be put in optional positions to perform various kinds of height adjustments. Besides, since the setup rod similar in form to the height adjusting bar of the height adjuster is pivotally coupled to the bar the rod can be set up and down. In any case where the auxiliary chair faces forward or backward, the range of the height adjustment can be extended further to widely adjust the reclination angle of the auxiliary chair and to correct the excessive inclination angle thereof to set the auxiliary chair in the optimum position depending on the purpose of the use thereof.

Since the structure of the height adjuster is simple, no special knowledge is needed for angularly displacing the height adjuster It is therefore easy to handle the reclining mechanism.

At that time, the bottom of the height adjuster and the bottom of the seat of the chair have the same cosurface. Therefore, the auxiliary chair is stably engaged with the sitting surface of the seat of the vehicle.

A reclining mechanism of the auxiliary chair is mounted on the bottom of the seat of the chair. Therefore, the reclining mechanism can be manufactured in small size. In either case where the auxiliary chair faces forward or backward, it can be fastened to the seat of the vehicle by using only the engaging levers.

DETAILED DESCRIPTION OF THE PREFERRED EMBODIMENTS

The present invention will now be described in detail with reference to the accompanying drawings.

Figure 1:
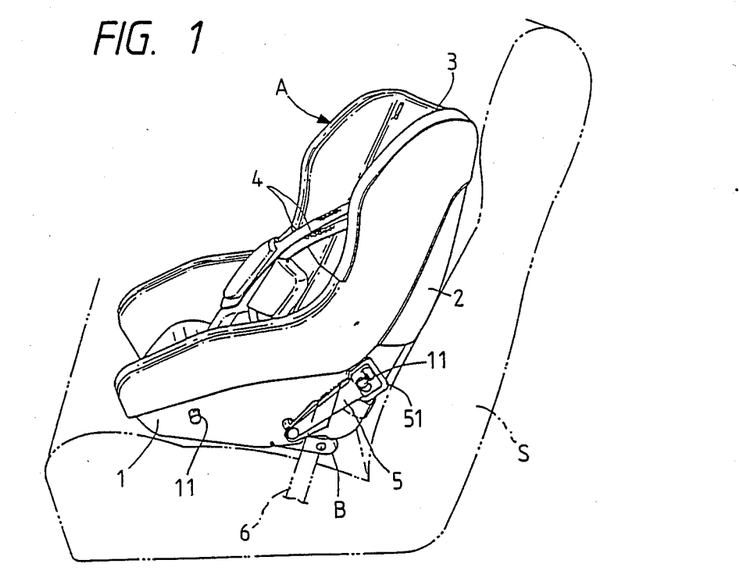
FIG. 1 is a perspective view of a fastening mechanism according to an embodiment of the present invention which is in the state of forwardly fastening an auxiliary chair to the seat of a vehicle.
Figure 2:
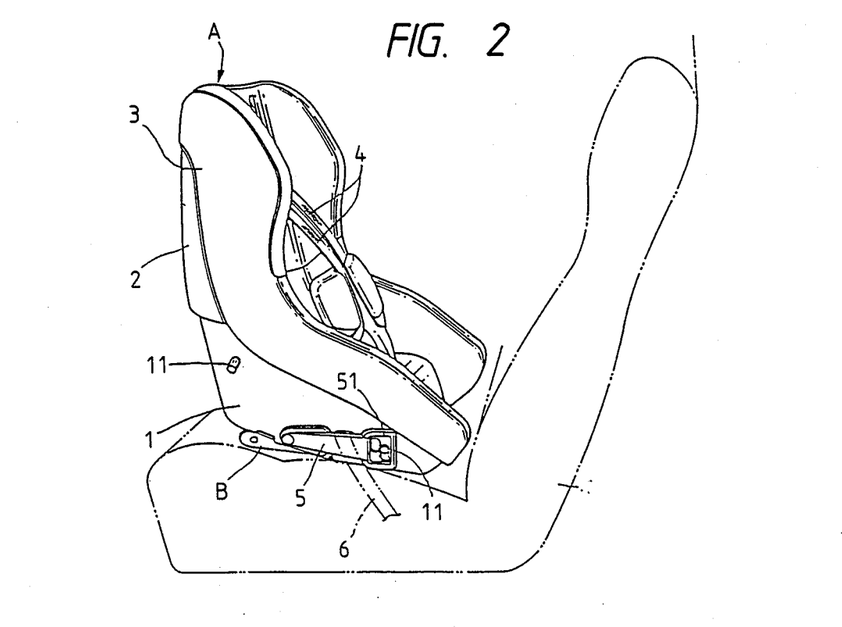
FIG. 2 is a perspective view of the fastening mechanism in the state of backwardly fastening the auxiliary chair to the seat of the vehicle.
Figure 3:
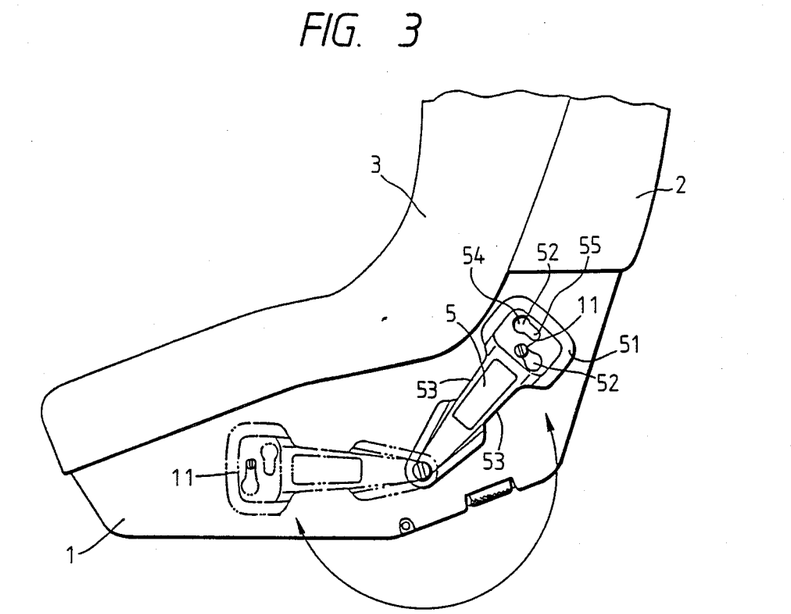
FIG. 3 is an enlarged view of the engaging plate provided as a part of the engaging lever and the engaging projection provided as part of a side of the seat.

FIGS. 1, 2 and 3 show a fastening mechanism according to an embodiment of the invention for an auxiliary chair A. The latter is removably fastened to the seat S of an automotive vehicle by the fastening mechanism to sit a little child in the chair. The body of the auxiliary chair A is made of hard synthetic resin or the like and comprises a seat 1 and a back 2. A cushioning material 3 such as sponge material having an appropriate elasticity is removably attached to a surface of the body of the chair A, with which the child comes into contact. Belts 4 for restraining the child in the chair A are attached to the body of the chair A so that the belts extend from the back 2 to the seat 1. Retractors (not shown) are attached to the bottom of the body of the chair A to wind or unwind the belts 4. The retractors are provided with emergency locking means (well known per se in the art) for preventing the belts 4 from being pulled out in case of emergency. The fastening mechanism includes belt engaging levers 5, each pivotally coupled to the side of the seat of the chair A. Each of the levers 5 is made of a plate whose width and thickness are adequate to engage the seat belt 6 of the vehicle with the lever to fasten the chair A to the seat S of the vehicle. The levers 5 are pivotally coupled at the butts or proximal ends thereof to the sides of the seat of the chair A so that the tips or distal ends of the levers can be swung. The belt engaging levers 5 are provided with engaging plates 51 at the tips of the levers, as best shown in FIG. 3. Each of the engaging plates 51 has two engaging holes 52. Each of the engagement holes 52 consists of an insertion hole 54 and a contiguously engagement slot 55 through which the engagement projection 11 may be inserted, to form a key hole-shaped slot. The engaging holes 52 of each engaging plate 41 are oriented in reverse to each other. The engagement slot 55 is formed in the engagement hole 52 so that the engagement lever 5 is urged to the engagement slot 55 by the tightening action of the automotive seat belt. Each belt engaging lever 5 has belt engaging notches 53 at the side edges of the lever. The length of each of the notches 53 is equal to or slightly larger than the width of the seat belt 6.

Figure 4:
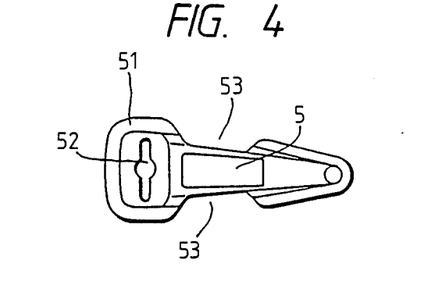
FIG. 4 is a view of a modification of the engaging hole of an engaging plate provided as a part of the engaging lever of the fastening mechanism.

The structure of each of the belt engaging levers 5 and the engaging projections 11 is not limited to the above but may be such that the lever has two thin holes and a single circular hole which has a diameter larger than the width of each thin hole and connects the thin holes to each other, as shown in FIG. 4. An engaging projection 11 inserted in the circular hole can be moved into ether of the thin holes.

Referring back to FIG. 3, the engaging projections 11 and the engaging holes 52 are disposed in such a manner that they are located on a circle whose center is at the pivotally coupled end of each belt engaging lever 5 and whose radius is equal to that of gyration of the lever. Two engaging projections 11 are located back and forth with respect to the pivotally coupled end of the lever so as to couple with the associated holes 52, respectively.

The locations of the engaging projections 11 and those of the engaging holes 52 are not particularly limited. However, it is preferable that the engaging projection 11 which is for forwardly fastening the auxiliary chair A to the seat S of the vehicle is located to make it possible to keep the engaging lever 5 inclined downwardly from the tip thereof toward the butt thereof as shown in FIG. 1, and that the other engaging projection 11 which is for backwardly fastening the auxiliary chair to the seat of the vehicle are located to make it possible to keep the engaging lever 5 horizontal as shown in FIG. 2.

The positional relationship between the belt engaging lever 5 and the engaging projections 11 is not limited to the above but may be reversed so that the engaging projection is provided on the inside surface of the engaging plate 51 and the like engaging holes 52 are provided in the side of the seat 1 of the chair A.

Figure 5:
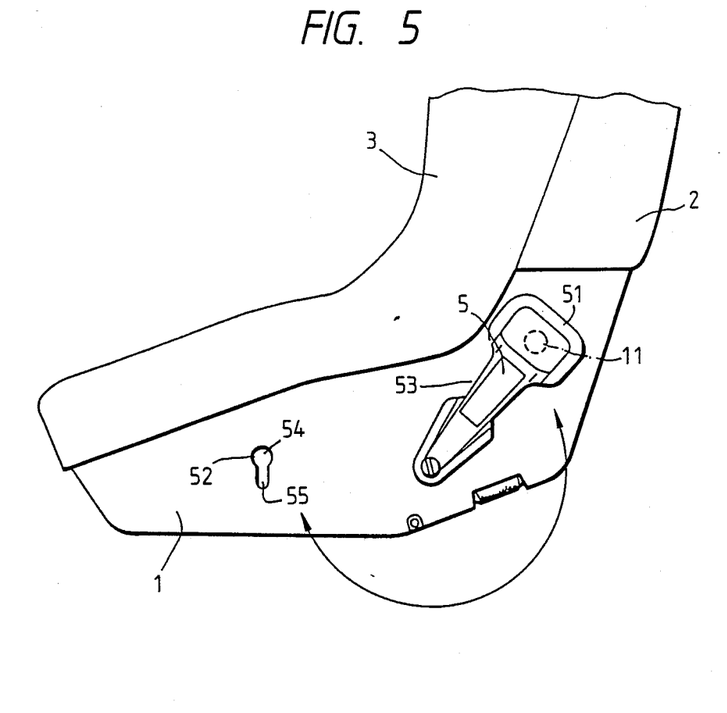
FIG. 5 is an enlarged view of a modification of the engaging plate of the engaging lever and a modification of the engaging hole of the plate.
Figure 6:
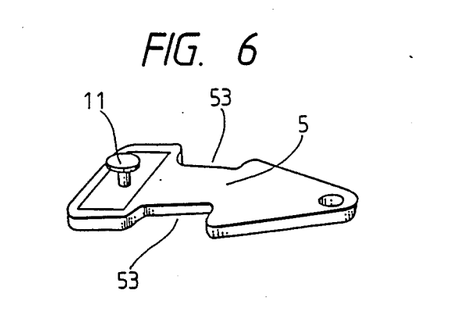
FIG. 6 is a perspective view of a modification of the engaging lever.

In this case, the engaging slot 55 is directed downwardly from engagement hole 52, as shown in FIGS. 5 and 6.

The operation of the fastening mechanism will now be described. When the auxiliary chair A is to be forwardly fastened to the seat S of the vehicle by the fastening mechanism as shown in FIG. 1, the end of the seat belt 6 provided at the seat of the vehicle is engaged with a buckle. As a result of the engagement, the seat belt 6 is tightened because the retractor therefor always applies a force to the seat belt in such a direction as to wind it. The engaging plate 51 of the engaging lever 5 is previously engaged with the engaging projection 11 provided on the rear portion of the side of the seat of the auxiliary chair A which is then put on the seat S of the vehicle. The engaging plate 51, provided at the tip of the engaging lever 5, is disengaged from the engaging projection 11 so that the lever can freely be swung up and down. After that, the seat belt 6 engaged with the buckle is partially pulled up so that the seat belt has a forcibly loosened portion, which is the hooked on the engaging leer 5 at the engaging notches 53 thereof, while the forcibly loosened portion is moved from the back portion to the lower portion of the auxiliary chair A.

The engagement lever 5 is entrained by the seat belt 6. Then, the engagement projection 11 located at a rear side portion of the auxiliary seat A is inserted into the insertion hole 54 of the engagement hole 52 formed in a part of the hook plate 51 formed at the end portion of the engagement lever 5. As a result, the engagement slot 55 of the engagement hole 52 is moved downwardly relative to the auxiliary seat A (i.e., in the direction where the seat belt 6 is drawn, to engage with the engagement projection to perform the engagement with the seat belt 6.) so that the engaging lever 5 is fitted with the engaging projection 11 as shown in FIG. 1.

As a result, the auxiliary chair A is forwardly fastened to the seat S of the vehicle in such a manner that the chair is stably pulled toward the back of the seat of the vehicle and is unlikely to move irregularly or unexpectedly.

Although the seat belt 6 is engaged with the engaging lever 5 after the disengagement of the engaging plate 51 from the engaging projection 11 in the above-described procedure, the seat belt can be engaged with the engaging lever in another procedure. Under the condition that the engaging lever 5 is engaged with the engaging projection 11 as the means for fastening such an auxiliary chair, in this condition, the engaging plate 51 of the engaging lever 5 is previously engaged with the engaging projection 11 provided on the upper rear portion of the side of the seat of the auxiliary chair A, and the end of the seat belt 6 not engaged with the buckle is laid upward through the gap between the engaging lever and the side of the seat 1 of the chair and tightened, so that the chair is consequently fastened to the seat S of the vehicle.

When the auxiliary chair A is to be backwardly fastened to the seat S of the vehicle by the fastening mechanism as shown in FIG. 2, the end of the seat belt is engaged with the buckle. As a result of the engagement, the seat belt 6 is tightened because the retractor therefor always applies a force to the seat belt in such a direction as to wind it in. The engaging plate 51 of the engaging lever 5 is previously engaged with the engaging projection 11 provided on the rear portion of the side of the seat of the auxiliary chair A which is then put on the seat S of the vehicle. The engaging plate 51 provided at the tip of the engaging lever 5 is disengaged from the engaging projection 11 so that the lever can freely be swung up and down. After that, the tightened seat belt 6 is partially pulled up so that it has a forcibly loosened portion, which is then hooked on the engaging lever 5 at the engaging notches 53 thereof, while the forcibly loosened operation is moved from the back portion to the lower portion of the auxiliary chair. The engaging hole 52 of the engaging plate 51 of the engaging lever 5 is then fitted with the engaging projection 11 provided on the front portion of the side of the seat 1 of the auxiliary chair A, so that the lever is put in a state shown in FIG. 2. As a result, the auxiliary chair A is backwardly fastened to the seat S of the vehicle in such a manner that the chair is stably pulled toward the back of the seat of the vehicle and is unlikely to move irregularly or unexpectedly. The auxiliary chair A is thus mounted on the seat S of the vehicle to face in the reverse direction to the driver of the vehicle.

Although the seat belt 6 of the vehicle is engaged with the engaging lever 5 after the disengagement of the tip of the lever from the engaging projection 11 in the above-described manipulation of backwardly fastening the auxiliary chair A to the seat S of the vehicle, the seat belt can be engaged with the engaging lever after the engagement of the tip of the lever with the engaging projection alike to the case that the chair is forwardly fastened to the seat of the vehicle.

Incidentally, in the forgoing embodiment, the seat belt 6 mounted on the lower side of the automotive seat is retained at the recess portion 53 of the engagement lever 5. However, it should be noted that some types of seat belts consist of a waist belt segment mounted on the lower side of the automotive seat and a shoulder belt segment mounted from above the automotive seat. In such a seat belt, the end portion of the seat belt is inserted into a buckle, and then the excess of the two seat belt segments are drawn to be hooked at the recess portion 53 of the engagement lever 5 in the same manner as in the single seat belt. The engagement hole 52 of the hook plate 51 and the engagement projection 11 are engaged with each other.

When the auxiliary chair A is to be removed away from the seat S of the vehicle, manipulation inverse to that described above is performed. At that time, whether the auxiliary chair A faces forward or backward, the engaging plate 51 of the engaging lever 5 is disengaged from the engaging projection 11 provided on the upper rear portion of the side of the seat of the auxiliary chair A, and the seat belt hooked on the lever at the engaging notches 53 thereof is then lifted so that the seat belt 6 is pulled out against the hoking force of the retractor therefor. The seat belt 6 is thereafter disengaged from the engaging lever 5. After that the engaging plate 51 of the engaging lever 5 is engaged with the engaging projection 11 again.

As a result, the auxiliary chair A is unfastened, so that it can be easily removed from the S of the vehicle.

Incidentally, it is possible to remove the auxiliary seat under the condition that the engagement lever 5 is in engagement as in the conventional method. In this case, first of all, the engagement between the buckle and the seat belt 6 is released. The seat belt 6 end portion (tongue portion for insertion of the buckle) which is released away from the buckle in the air gap portion defined between the engagement lever 5 engaged with the fixed to the engagement projection 11 and the side wall of the seat portion 1 is further drawn so that the auxiliary seat A may be removed.

FIGS. 7A to 14 shown an auxiliary chair A and a reclining mechanism which is provided for the auxiliary chair, which is removably fastened to the seat S of a vehicle to sit a little child in the chair.

Figure 8:
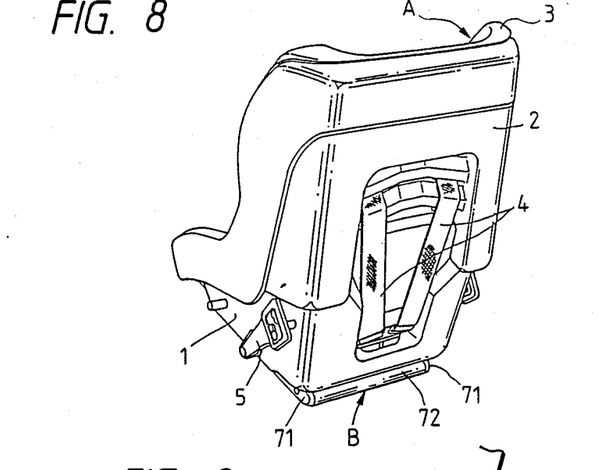
FIG. 8 is another perspective view of the auxiliary chair provided with the reclining mechanism and fastened to the seat of the vehicle as shown in FIG. 7A.
Figure 9:
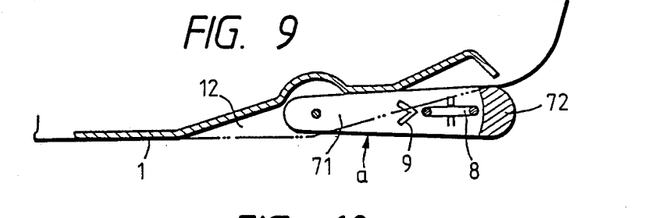
FIG. 9 is an enlarged sectional view of a major part of the reclining mechanism in a state for the auxiliary chair fastened to the seat of the vehicle as shown in FIG. 7A.

The reclining mechanism includes a height adjuster B attached to the bottom of the seat 1 of the body of the auxiliary chair A as shown in FIGS. 8 and 9. The height adjuster B comprises two side bars 71 and a single transverse bar 72 which ware disposed in the form of a U. The butts of the side bars 71 are pivotally coupled to the bottom of the seat 1 of the body of the chair A, but may be pivotally coupled to the sides of the seat 1 instead. As shown in FIGS. 10 to 14 a U-shaped setup rod 8 is attached to the insides of the side bars 71 so that the rod extends from one of the side bars to the other. The setup rod 8 is pivotally coupled at both the ends thereof to the side bars 71 near the tips thereof. V-shaped support projections 9 are provided on the insides of the side bars 71 near the pivotally coupled portions of the setup rod 8 so as to support the rod by the upper or lower slopes of the projections when the rod is set up. Stops 10 are provided on the insides of the side bars 71 and have an appropriate projecting height therefrom to act on the setup rod 8. When the setup rod 8 is not in use, it is fitted in the recesses of the central portions of the stoppers 10 so as to be prevented from becoming higher or lower than the side bars 71. The bottom of the seat 1 of the body of the auxiliary chair A is provided with a recessed portion 12 in which the height adjuster B is fitted and to which the butts of the side bars 71 are pivotally coupled. It is general that the seat surface of the automotive seat is slanted rearwardly. Accordingly, to compensate for this slant, the following specific means is provided according to the present invention.

Namely, in the case where the height adjustment mechanism B is supported onto the lower rear portion of the seat portion, the lower surface of the height adjustment mechanism B is flush with the tip end surface of the lower portion of the seat portion 1 (see FIG. 9). In the case where the height adjustment mechanism B is rotated to support the lower front portion of the seat portion 1, the lower surface of the height adjustment mechanism B is flush with the rear end surface of the lower surface of the seat portion 1 (see FIG. 12). In order to meet these requirements, the lower surface of the seat portion is substantially V-shaped. With such an arrangement, it is possible to keep the auxiliary seat A at a suitable standing angle either in the forward or rearward posture.

Figure 7A:
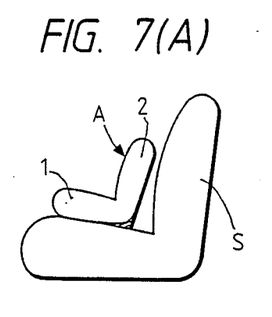
FIGS. 7A, 7B, 7C, 7D and 7E show an auxiliary chair forwardly or backwardly fastened at various inclination angles to the seat of a vehicle and provided with a reclining mechanism.
Figure 7B:
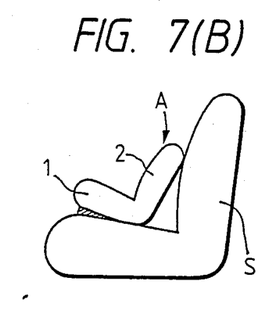
Figure 7C:
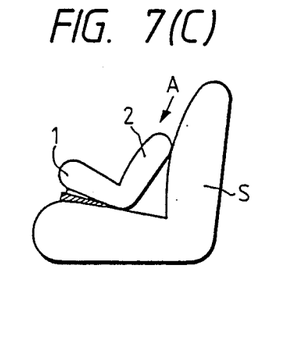

The operation of the reclining mechanism will now be described. The auxiliary chair A can be forwardly fastened to the seat in the same way as that shown in FIGS. 1 to 3. The auxiliary chair A is forwardly fastened to the seat, in a first configuration in which the chair is put in a non-reclining position as shown in FIG. 7A, in a second configuration in which the chair is put in a slight reclining position as shown in FIG. 7B, or in a third configuration in which the chair is put in a deep reclining position as shown in FIG. 7C.

In the first configuration, the auxiliary chair A is put in the non-reclining position, the height adjuster B attached to the bottom of the auxiliary chair is turned to the rear portion of the bottom of the sat 1 of the chair A so that the first configuration is established. At that time, the back 2 of the chair is put in an appropriate setup position as shown in FIG. 7A and 9.

As a result, the bottom of the seat 1 of the chair A is put in contact with the sitting surface of the seat S of the vehicle only at the front portion of the bottom of the seat of the chair and the bottom of the height adjuster B is put in contact with the sitting surface of the seat of the vehicle at the rear portion of the bottom of the seat of the chair.

At the same time, the bottom of the height adjuster B and the bottom of the seat 1 of the chair A have the same co-surface. Therefore, the auxiliary chair is engaged with the sitting surface of the seat of the vehicle. In general, the inclination of the sitting surface of the seat S is lifted at the rear portion. In the present invention, the inclination of the bottom of the seat 1 and the back of the seat 1 is lifted at the rear portion. The angle between the bottom of the seat and the back of the seat is the same direction which is the inclination of the bottom of the seat 1 and the back of the seat.

If the inclination of the sitting surface of the seat S of the vehicle is large, the setup rod 8 attached to the side bars 71 is set up to correct the inclination of the seat 1 of the auxiliary chair A. In that case, the setup rod 8 is supported at the end portions thereof by the upper slopes of the V-shaped support projections 9 provided on the side bars 71, so that the seat 1 supported at the rear portion of the bottom thereof by the height adjuster B is lifted further by the setting-up of the rod. As a result, the seat 1 is lifted at the rear portion of the bottom thereof so that the chair A is kept in an appropriate setup position.

Figure 10:
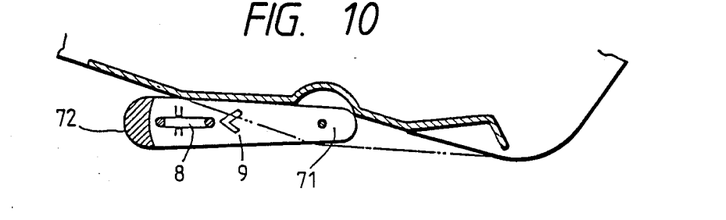
FIG. 10 is an enlarged sectional view of the major part of the reclining mechanism in a state for the auxiliary chair fastened to the seat of the vehicle as shown in FIG. 7B.

In the second configuration, the height adjuster B attached to the bottom of the auxiliary chair A is turned forward from a position shown in FIG. 7A to a position shown in FIG. 7B. At that time, the height adjuster B taken out from the recessed portion 12 of the seat 1 of the chair A and is turned to the front portion of the bottom of the seat so that the seat is supported at the front portion thereby by the height adjuster. As a result, the seat 1 of the chair A is lifted only at the front portion thereof by the height adjuster B, and the chair including the back 2 is slightly downwardly inclined backward as a whole, as shown in FIG. 7B. The chair A is thus put in the slight reclining position as shown in FIGS. 7B and 10.

At the same time, the bottom of the height adjuster B and the bottom of the seat 1 of the chair A have the same co-surface. Therefore, the auxiliary chair is stably engaged with the sitting surface of the seat of the vehicle.

Figure 11:
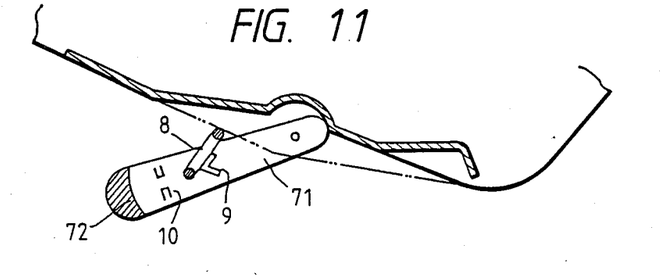
FIG. 11 is an enlarged sectional view of the major part of the reclining mechanism in a state for the auxiliary chair fastened to the seat of the vehicle as shown in FIG. 7C.

In the third configuration the setup rod 8 attached to the height adjuster B is set up relative to the auxiliary chair B being in the position shown in FIG. 7B. At that time, the setup rod 8 is supported at both end portions thereof by the upper slopes of the V-shaped support projections 9 on the side bars 71 as shown in FIG. 11. As a result, the seat 1 of the chair A supported at the front portion of the bottom thereof by the height adjuster B is lifted further at the front portion of the seat by the setup height of the setup rod 8 so that the seat 1 of the chair A is downwardly inclined in the backward direction. The chair A including the back 2 is thus put in the deep reclining position as a whole, as shown in FIGS. 7C and 11. In that case, the bottom of the seat 1 of the chair A is put in contact with the sitting surface of the seat S of the vehicle only at the rear portion of the bottom of the seat 1 and the bottom of the height adjuster B is put in contact with the front portion of the bottom of the seat 1.

Figure 7D:
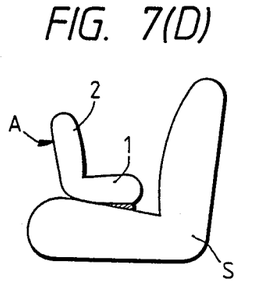
Figure 7E:
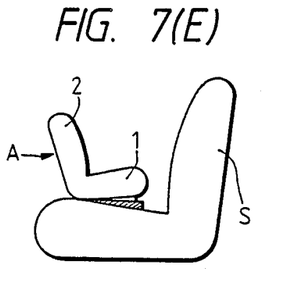

The auxiliary chair A can be backwardly fastened to the seat S of the vehicle in the same way as that shown in FIGS. 1, 2 and 3. The auxiliary chair A is backwardly fastened to the seat S of the vehicle in a fourth configuration in which the chair is put in a non-reclining position as shown in FIG. 7D, or in a fifth configuration in which the chair is put in a reclining position as shown in FIG. 7E.

Figure 12:
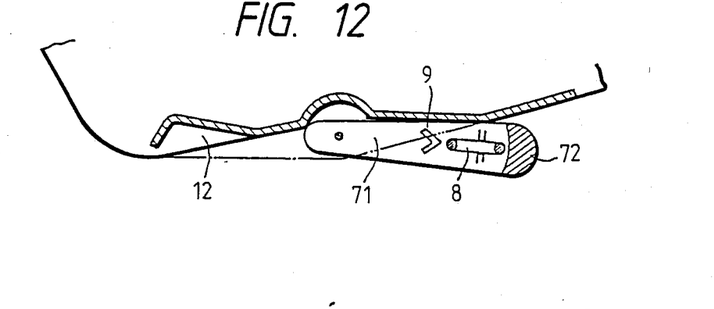
FIG. 12 is an enlarged sectional view of the major part of the reclining mechanism in a state for the auxiliary chair fastened to the seat of the vehicle as shown in FIG. 7D.

For the slight lifting, the height adjuster B located at the rear portion of the bottom of the seat 1 of the chair A is turned to the front portion of the bottom of the seat 1 thereof so that the seat is supported at the front portion thereof by the height adjuster. As a result, the seat 1 of the chair A backwardly put on the seat S of the vehicle is lifted at the front portion of the sweat of the chair by the height adjuster B so that the chair A including the back 2 is kept in an appropriate setup position, as shown in FIG. 7D and 12. The chair is backwardly fastened in the non-reclining position (the fourth configuration) to the seat S of the vehicle.

In the case where the slant angle of the seat surface of the automotive seat is kept at a large angle, it is possible to compensate for the angle by electing the standing lever 8 that is mounted on each side lever 71.

Figure 13:
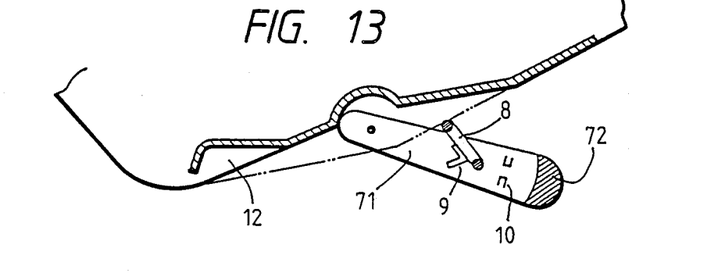
FIG. 13 is an enlarged sectional view of the major part of the reclining mechanism in a state for the auxiliary chair fastened to the seat of the vehicle as shown in FIG. 7E.
Figure 14:
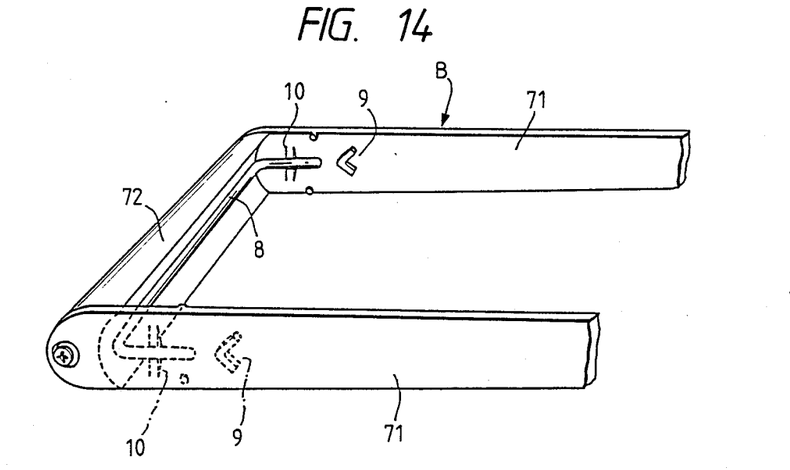
FIG. 14 shows an enlarged perspective view of a major part of the height adjuster of the reclining mechanism.

The auxiliary chair A can be backwardly fastened in the reclining position fifth configuration to the seat S of the vehicle in the same way as the manipulation for putting the chair in the position shown in FIG. 7C, except that the chair faces backward. For the backward fastening, the setup rod 8 attached to the height adjuster B is set up relative to the chair A being in the position shown in FIG. 7D, so that the setup rod is supported at both the end portions thereof by the upper slopes of the V-shaped support projections 9 as shown in FIG. 13. As a result, the seat 1 supported at the front portion of the bottom thereof by the height adjuster B is lifted further at the front portion of the seat by the setting-up of the rod 8 so that the seat is much downwardly inclined forward as shown in FIG. 7E. Consequently, the back 2 integrally coupled with the seat 1 is also much downwardly inclined forward. The auxiliary chair A is thus put in the reclining position as shown in FIGS. 7E and 14.

Under the condition that the front portion of the lower surface of height adjustment mechanism B and the rear portion of the lower portion of the seat portion are connected with the sitting surface of the seat of the vehicle.

Although backwardly fastening the auxiliary chair A in the reclining position to the seat S of the vehicle is described above in such a manner that the manipulation for putting the chair in the position shown in FIG. 7B or 7D is performed as the initial stage of the forward or the backward fastening of the chair, the reclining mechanism is not confined thereto but may be otherwise manipulated so that the setup rod 8 is first set up and the height adjuster B is then turned forward, for example, in backwardly fastening the chair in the reclining position to the seat of the vehicle.

As to how to handle the infant, it should be once off away from the auxiliary seat to ensure the safety aspect of the infant during the changing operation and to facilitate the changing operation.

It is advisable to perform the changing operation while engaging the hook plate 51 of the engagement lever 5 with the engagement projection 11 under the condition that the seat belt 6 is removed away from the engagement lever 5. Thus, the end portion of the engagement lever is prevented from swinging. The changing operation may readily be attained.

What is claimed is:

1. An auxiliary chair adapted to be removably mounted on an automotive seat and retained on said automotive seat by a seat belt associated with said automotive seat, comprising:
- a seat portion having a front edge, and a rear edge;
- a backrest extending from said rear edge of said seat portion;
- means for adjusting a slant angle of said seat portion, said adjusting means including a pair of adjusting bars each of which is pivotally attached at its proximal end to a lower portion of said seat portion, so that said adjusting bars may take a forward position and a rearward position; and
- means for fixing said auxiliary chair to said automotive seat, said fixing means including a pair of seat belt engaging levers for retaining said auxiliary chair to said automotive seat by engaging said seat belt, each of said engaging levers being pivotally attached at its proximal end portion to a respective side surface of said seat portion so that its distal end portion may freely be angularly moved, said fixing means further including associated engagement mechanisms each of which is provided at the side of said seat portion and is engageable with said distal end portion of a respective engaging lever to maintain engagement of said engaging levers with said seat belt.

2. An auxiliary chair according to claim 1, further including engaging means provided in a forward portion and a rearward portion of said distal end portion of each of said levers for engaging said engagement mechanisms.

3. An auxiliary chair according to claim 2, wherein notches for engaging said seat belt are provided in said engaging levers at side edges thereof.

4. An auxiliary chair according to claim 3, wherein said engaging levers are provided with engaging projections at said distal end portion of said levers, and engaging holes, in which said projections are fitted, are provided in appropriate positions in side surfaces of said seat portion.

5. An auxiliary chair according to claim 1, wherein said pair of adjusting bars are comprised of a pair of said bars, each side bar being pivotally coupled at one end thereof to a center of the bottom of said seat portion so that said pair of side bars can be displaced in a forward direction and in a backward direction; a transverse bar extends between the other ends of said side bars, said transverse bar being supportable against a lower rearward portion of said chair when the side bars are displaced in the backward direction such that the lower surface of said transverse bar is flush with a lower surface of said chair.

6. An auxiliary chair according to claim 5, wherein said side bars form a U-shaped member together with the transverse bar.

7. An auxiliary chair according to claim 6, further including a setup rod pivotally coupled at its ends to side portions of respective adjusting bars so that said rod can be set up and down, and the setup height of said adjusting bars can be increased by setting up said rod.

* * * * *